United States Patent
Kita

(10) Patent No.: US 7,236,214 B2
(45) Date of Patent: Jun. 26, 2007

(54) LIQUID CRYSTAL TELEVISION RECEIVER AND LIQUID CRYSTAL DISPLAY APPARATUS

(75) Inventor: Tatsuya Kita, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 428 days.

(21) Appl. No.: 10/856,959

(22) Filed: May 28, 2004

(65) Prior Publication Data

US 2004/0246384 A1 Dec. 9, 2004

(30) Foreign Application Priority Data

May 28, 2003 (JP) ............ P 2003-150025

(51) Int. Cl.
*H04N 5/63* (2006.01)
(52) U.S. Cl. .................. 348/790; 345/204
(58) Field of Classification Search .......... 348/790, 348/791, 794, 725, 730; 345/211, 204, 205, 345/87, 92, 88
See application file for complete search history.

(56) References Cited

U.S. PATENT DOCUMENTS

| | | | | |
|---|---|---|---|---|
| 4,792,857 A * | 12/1988 | Akiyama | ............ | 348/793 |
| 4,985,770 A * | 1/1991 | Nagashima et al. | ........ | 348/550 |
| 5,057,928 A * | 10/1991 | Nagashima et al. | ........ | 348/793 |
| 5,078,476 A * | 1/1992 | Shin | ............ | 345/102 |
| 7,106,319 B2 * | 9/2006 | Ishiyama | ............ | 345/211 |
| 2005/0030436 A1 * | 2/2005 | Kita | ............ | 348/790 |
| 2006/0125767 A1 * | 6/2006 | Kang et al. | ........ | 345/102 |
| 2006/0132661 A1 * | 6/2006 | Yamamoto | ........ | 348/725 |

FOREIGN PATENT DOCUMENTS

| | | |
|---|---|---|
| JP | 9-50006 | 2/1997 |
| JP | 9-51633 | 2/1997 |

OTHER PUBLICATIONS

Patent Abstracts of Japan, Publication No. 09-050006, publication date: Feb. 18, 1997 (2 pages).
Patent Abstracts of Japan, Publication No.: 09-051633, Publication Date: Feb. 18, 1997, 2 pages.
Japanese Office Action for Japanese patent application 2003-150025, mailed Jan. 16, 2006, and English translation thereof, 3 pages.

* cited by examiner

*Primary Examiner*—Paulos Natnael
(74) *Attorney, Agent, or Firm*—Osha Liang LLP

(57) ABSTRACT

In a configuration including a liquid crystal panel, a gate driver for driving a gate line of the liquid crystal panel, a data driver for driving a data line of the liquid crystal panel, a cold cathode tube used as a light source of a back light part for illuminating the liquid crystal panel from the back, a boosting circuit for driving and lighting the cold cathode tube, and a first DC power source part for generating a first DC output used as an operating power source of the data driver and also used as an operating power source of the boosting circuit, a regulator circuit for eliminating a noise component caused by the boosting circuit is inserted into a path of the first DC output ranging from the first DC power source part to the data driver.

6 Claims, 5 Drawing Sheets

LIQUID CRYSTAL TELEVISION RECEIVER AND LIQUID CRYSTAL DISPLAY APPARATUS

BACKGROUND OF THE INVENTION

1. Field of the Invention

The present invention relates to a liquid crystal television receiver and a liquid crystal display apparatus including a liquid crystal panel for displaying video and a boosting circuit for lighting and driving a cold cathode tube used as a light source of a back light part for illuminating the liquid crystal panel from the back.

2. Description of the Related Art

In a television receiver using a liquid crystal panel as a display device, a gate driver 11 for driving a gate line of a liquid crystal panel 12 and a data driver (source driver) 14 for driving a data line (source line) of the liquid crystal panel 12 are provided in a liquid crystal display part 91 for displaying a video signal outputted from a receiving part 4 as shown in FIG. 5. Also, a first DC power source part 1 which is an AC adapter generates and sends out a first DC output 21 stabilized at 12 V. Also, a boosting circuit 19 of a back light part 5 is constructed so as to drive a cold cathode tube (not shown) using the first DC output 21 as an operating power source. Also, a second DC power source part 2 generates and sends out a second DC output 22 of 3.3 V required by the receiving part 4 etc. using an output 31a as an operating power source. Also, in the side of the liquid crystal display part 91, a DC output 23 of 12 V required by the data driver 14 is generated using a DC—DC converter 92 in which the second DC output 22 is used as an operating power source. Further, a DC output requested by the gate driver 11 is generated using a step-down circuit 93 or a charge-pomp circuit 94 (called a first conventional art).

As described above, in the first conventional art, the dedicated DC—DC converter 92, the step-down circuit 93 and the charge-pomp circuit 94 are provided in order to generate the DC output 23 used as an operating power source of the data driver 14. As a result of this, a configuration of a power source system becomes complicated and an increase in the number of parts or an increase in part cost is caused. A conventional art proposed to solve this problem will be described below (called a second conventional art). That is, in this art, a stabilized DC output sent out of a switching power source is supplied to a back light lighting control circuit as an operating power source and also is supplied to an output voltage control circuit for supplying a predetermined voltage of the fourth kind to a liquid crystal driving circuit as an operating power source. Therefore, there is no need to generate a DC output separately for the operating power source of the output voltage control circuit, and complication of the configuration of the power source system is avoided (for example, JP-A-9-50006).

However, in the case of using the second conventional art, a new problem arises and this problem will be described by applying a configuration of the second conventional art to a configuration of FIG. 5. That is, in the case of conforming to the configuration of the second conventional art, the first DC output 21 sent out of the first DC power source part 1 is guided to the boosting circuit 19 of the back light part 5 as an operating power source and also is guided to the data driver 14 as an operating power source. On the other hand, the data driver 14 drives the liquid crystal panel 12 by a signal corresponding to luminance of a pixel. Therefore, when a noise level included in the operating power source is large, due to the influence, variations in luminance due to the influence of noise occur in luminance of the liquid crystal panel 12 driven and a decrease in image quality is caused. In the meanwhile, the boosting circuit 19 forms a switching circuit having relatively large output electric power. As a result of this, a noise component caused by switching of the boosting circuit 19 tends to leak in the first DC output 21 and at the time when the noise component leaks in, the decrease in image quality described above was caused.

SUMMARY OF THE INVENTION

The invention is devised to solve the problem, and an object of the invention is to provide a liquid crystal television receiver capable of efficiently suppressing a decrease in image quality resulting from noise caused by a boosting circuit or a DC power source part in the case of sharing an operating power source of the boosting circuit or the DC power source part and an operating power source of a data driver.

Also, an object of the invention is to provide a liquid crystal display apparatus capable of preventing a decrease in image quality resulting from noise caused by a boosting circuit in the case of sharing an operating power source of a data driver and an operating power source of the boosting circuit by inserting a regulator circuit for eliminating a noise component caused by the boosting circuit into a path of a DC output used as the operating power source of the data driver.

Also, in addition to the object, an object of the invention is to provide a liquid crystal display apparatus capable of more reducing a decrease in image quality resulting from noise caused by a boosting circuit by branching a path of a DC output to a data driver from a path of a DC output to the boosting circuit in a position of the vicinity of a supply point to which a DC output used as an operating power source is supplied.

In order to solve the objects, a liquid crystal television receiver according to a first aspect of the invention includes a liquid crystal panel for performing active matrix driving, a gate driver for driving a gate line of the liquid crystal panel, a data driver for driving a data line of the liquid crystal panel by a signal corresponding to luminance of a pixel, a cold cathode tube used as a light source of a back light part for illuminating the liquid crystal panel from the back, a boosting circuit for driving and lighting the cold cathode tube, a first DC power source part for generating a first DC output used as an operating power source of the data driver and also used as an operating power source of the boosting circuit, a second DC power source part which is a switching power source for generating a second DC output using the first DC output as an operating power source, a receiving part for using the second DC output as an operating power source and receiving commercial broadcast and also outputting a video signal obtained by the receiving, and a regulator circuit for eliminating a noise component caused by the boosting circuit, wherein the regulator circuit is inserted into a path of the first DC output ranging from the first DC power source part to the data driver, and the path of the first DC output ranging from the first DC power source part to the data driver is branched from a path of the first DC output ranging from the first DC power source part to the boosting circuit.

Also, a liquid crystal display apparatus according to a second aspect of the invention is applied to a liquid crystal display apparatus including a liquid crystal panel for performing active matrix driving and displaying video by a video signal, a gate driver for driving a gate line of the liquid crystal panel, a data driver for driving a data line of the liquid crystal panel by a signal corresponding to luminance of a pixel, a cold cathode tube used as a light source of a back light part for illuminating the liquid crystal panel from the back, a boosting circuit for driving and lighting the cold cathode tube, a first DC power source part for generating a first DC output used as an operating power source of the data driver and also used as an operating power source of the boosting circuit, and a regulator circuit for eliminating a noise component caused by the boosting circuit, wherein:

the regulator circuit is inserted into a path of the first DC output ranging from the first DC power source part to the data driver.

That is, from the boosting circuit, a noise component caused by a switching operation leaks in the path of the first DC output. However, the noise component leaking in the path of the first DC output is eliminated by the regulator circuit, so that a noise level intruding into the data driver is reduced.

Also, in addition to the configuration described above, the path of the first DC output ranging from the first DC power source part to the data driver is branched from a path of the first DC output ranging from the first DC power source part to the boosting circuit.

A liquid crystal television receiver according to a third aspect of the invention includes a liquid crystal panel for performing active matrix driving, a gate driver for driving a gate line of the liquid crystal panel, a data driver for driving a data line of the liquid crystal panel by a signal corresponding to luminance of a pixel, a cold cathode tube used as a light source of a back light part for illuminating the liquid crystal panel from the back, a boosting circuit for driving and lighting the cold cathode tube, a first DC power source part for generating a first DC output used as an operating power source of the data driver and also used as an operating power source of the boosting circuit, a second DC power source part which is a switching power source for generating a second DC output using the first DC output as an operating power source, and a receiving part for using the second DC output as an operating power source and receiving commercial broadcast and also outputting a video signal obtained by the receiving, and the liquid crystal television receiver is applied to a liquid crystal television receiver in which video by a video signal outputted by the receiving part is displayed on the liquid crystal panel. Then, a low-pass filter for eliminating a noise component caused by the boosting circuit and a noise component caused by the second DC power source part is inserted into a path of the first DC output ranging from the first DC power source part to the data driver, and the path of the first DC output ranging from the first DC power source part to the data driver is branched from a path of the first DC output ranging from the first DC power source part to the boosting circuit and a path of the first DC output ranging from the first DC power source part to the second DC power source part in the vicinity of a position in which a path length ranging to an output point of the first DC output sent out by the first DC power source part is minimized within a range capable of branching the path of the first DC output ranging from the first DC power source part to the data driver from the path of the first DC output ranging from the first DC power source part to the boosting circuit and the path of the first DC output ranging from the first DC power source part to the second DC power source part.

That is, from the boosting circuit, a noise component caused by a switching operation leaks in the path of the first DC output. Also, from the second DC power source part, a noise component caused by a switching operation leaks in the path of the first DC output. However, the noise components leaking in the path of the first DC output are eliminated by the low-pass filter, so that a noise level intruding into the data driver is reduced. Also, a path length in which the data driver, the boosting circuit and the second DC power source part are shared is short with respect to the path of the first DC output. Therefore, with respect to a noise level caused by sharing the path of the first DC output used as an operating power source, the level is suppressed to a very small value. As a result of this, the noise level intruding into the data driver is suppressed to an extremely small level in combination with action of the low-pass filter.

Also, a liquid crystal display apparatus according to a fourth aspect of the invention is applied to a liquid crystal display apparatus including a liquid crystal panel for performing active matrix driving and displaying video by a video signal, a gate driver for driving a gate line of the liquid crystal panel, a data driver for driving a data line of the liquid crystal panel by a signal corresponding to luminance of a pixel, a cold cathode tube used as a light source of a back light part for illuminating the liquid crystal panel from the back, a boosting circuit for driving and lighting the cold cathode tube, and a first DC power source part for generating a first DC output used as an operating power source of the data driver and also used as an operating power source of the boosting circuit. Then, a low-pass filter for eliminating a noise component caused by the boosting circuit is inserted into a path of the first DC output ranging from the first DC power source part to the data driver.

That is, from the boosting circuit, a noise component caused by a switching operation leaks in the path of the first DC output. However, the noise component leaking in the path of the first DC output is eliminated by the low-pass filter, so that a noise level intruding into the data driver is reduced.

Also, in addition to the configuration described above, a path of the first DC output ranging from the first DC power source part to the data driver and a path of the first DC output ranging from the first DC power source part to the boosting circuit are branched in the vicinity of a position in which a path length ranging to an output point of the first DC output sent out by the first DC power source part is minimized within a range capable of branching the path of the first DC output ranging from the first DC power source part to the data driver and the path of the first DC output ranging from the first DC power source part to the boosting circuit.

That is, a path length in which the data driver and the boosting circuit are shared is short with respect to the path of the first DC output. As a result of this, with respect to a noise component caused by sharing the path of the first DC output used as an operating power source, the level is suppressed to a very small value.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

First Embodiment

One embodiment of the invention will be described below with reference to the drawings.

Figure 3:
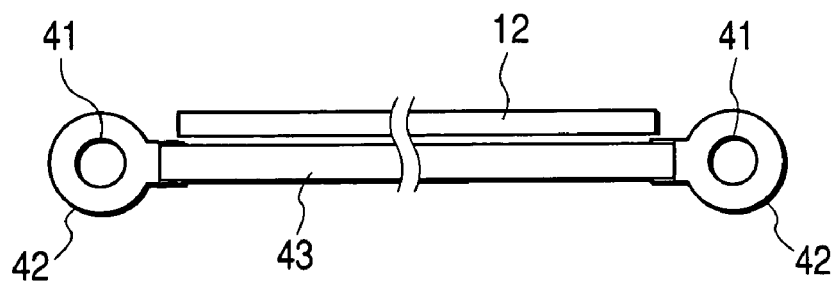
FIG. 3 is a sectional view showing a configuration of a back light part.

FIG. 3 is a sectional view showing a configuration of a back light part used in a liquid crystal television receiver to which one embodiment of a liquid crystal display apparatus according to the invention is applied.

In the drawing, cold cathode tubes 41 with elongated cylindrical shape are provided in each of the ends of both sides of an optical waveguide plate 43 which has rectangular shape in plan view and is made of flat white synthetic resin. Also, reflection plates 42 for reflecting light from the cold cathode tubes 41 to the side of the optical waveguide plate 43 are provided on the respective circumferences of the cold cathode tubes 41. Then, a liquid crystal panel 12 for transmitting light from the optical waveguide plate 43 and displaying video is provided in the front side (upper side in the drawing) of the optical waveguide plate 43.

Figure 1:
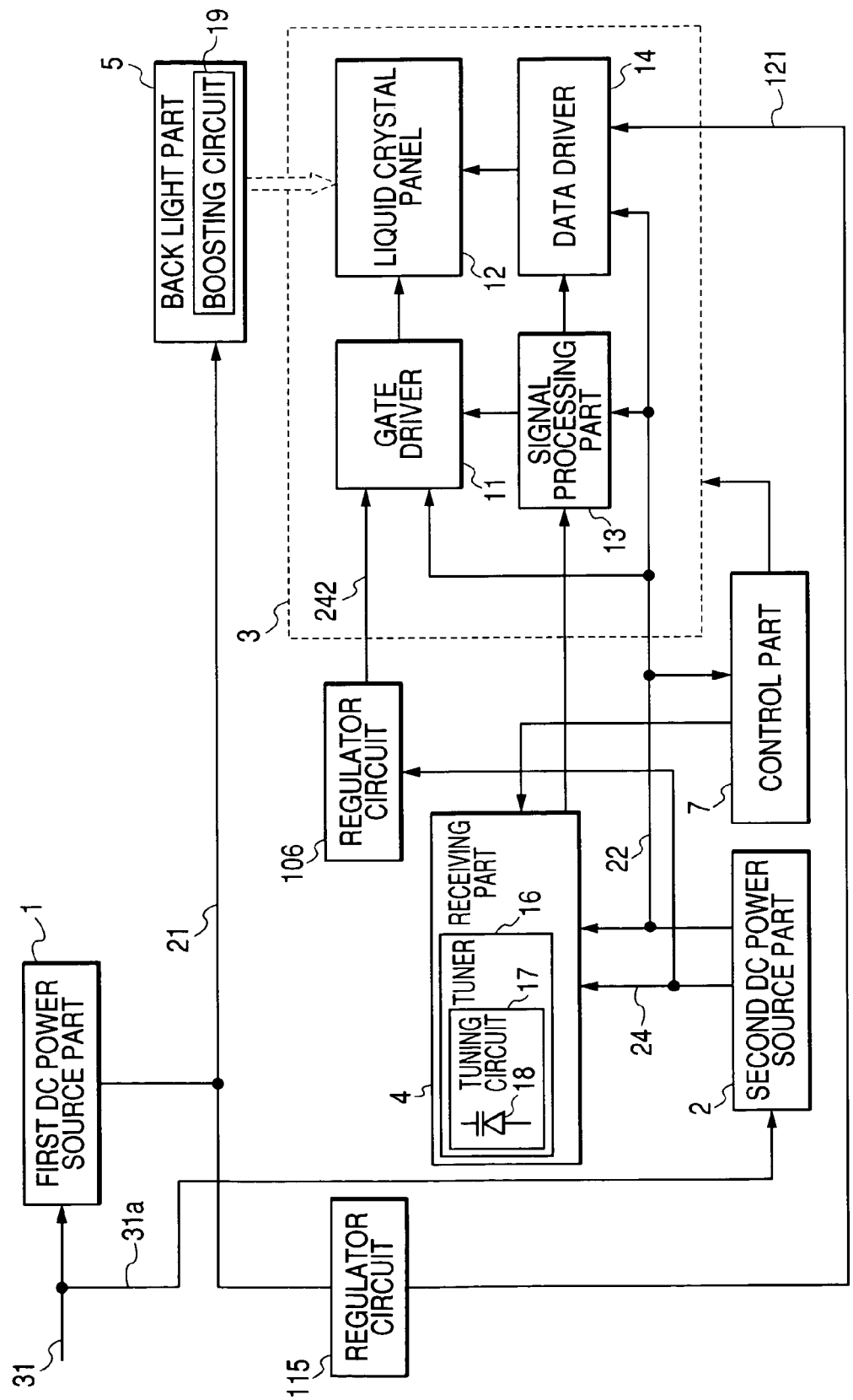
FIG. 1 is a block diagram showing an electrical configuration of a liquid crystal television receiver to which one embodiment of a liquid crystal display apparatus according to the invention is applied.
Figure 5:
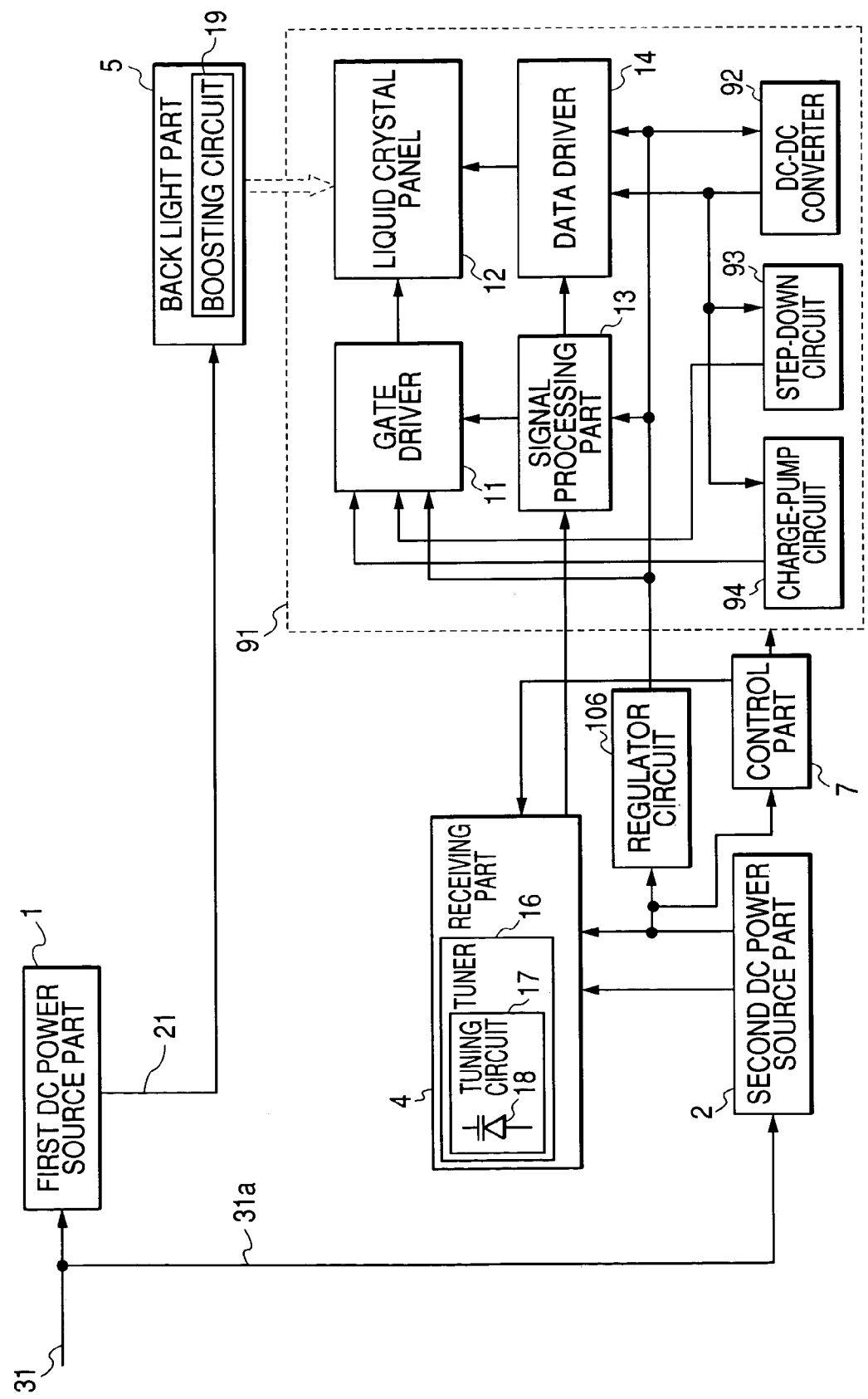
FIG. 5 is a block diagram showing an electrical configuration of a conventional art.

FIG. 1 is a block diagram showing an electrical configuration of the liquid crystal television receiver, and the same signs as signs in FIG. 5 are attached to blocks with the same configuration as that of the conventional art shown in FIG. 5.

A first DC power source part 1 which is an AC adapter configured by a switching power source generates a first DC output 21 of 12 V from a commercial power source 31. The first DC output 21 is guided to a boosting circuit 19 of a back light part 5 and a second DC power source part 2 as an operating power source. Also, the first DC output 21 guided to the power source input terminal 26 is guided to a data driver 14 through a regulator circuit 115.

The second DC power source part 2 generates a second DC output 22 of 3.3 V from the DC output 21 of 12 V. Then, the second DC output 22 generated is sent out to a gate driver 11, a signal processing part 13, the data driver 14, a receiving part 4 and a control part 7. Also, the second DC power source part 2 generates a DC output 24 of 33 V used as a DC power source for tuning used in order that a tuner 16 of the receiving part 4 converts a tuning frequency of a tuning circuit 17 into a target frequency, and sends out the DC output 24 to the receiving part 4. Also, the DC output 24 is sent out to the gate driver 11 through a regulator circuit 115. That is, it is constructed so that the DC output 24 of 33 V is used as a power source for an analog circuit of the receiving part 4 and also is used as a power source of the gate driver 11 which is a circuit block for performing a digital operation.

The receiving part 4 receives commercial broadcast of a channel instructed by the control part 7 and also sends out a video signal obtained by the receiving to the signal processing part 13 of a liquid crystal display part 3. For this purpose, the tuner 16 is provided. Then, the tuner 16 sets a tuning frequency of the tuning circuit 17 at a frequency corresponding to a received channel by applying a tuning signal generated from the DC output 24 to a variable capacitance diode 18 which is an element forming the tuning circuit 17.

The liquid crystal display part 3 displays a video signal sent out of the receiving part 4 on the liquid crystal panel 12. For this purpose, the gate driver 11, the signal processing part 13 and the data driver (source driver) 14 are provided. The signal processing part 13 forms a block in which the DC output 22 of 3.3 V is used as an operating power source. Then, a signal indicating timing of scanning is generated from the video signal sent out of the receiving part 4 and is sent out to the gate driver 11. Also, a signal indicating luminance about each of the primary colors is generated from the video signal and is sent out to the data driver 14.

The gate driver 11 forms a block in which a DC output 242 of 33 V sent out of the regulator circuit 106 and the second DC output 22 of 3.3 V are used as an operating power source (a current value of the DC output 241 is 10 mA at the maximum and a normal current value is several mA). Then, a gate on signal is generated from the DC output 241 according to a signal indicating timing of scanning sent out of the signal processing part 13. And, a gate line of the liquid crystal panel 12 is driven by the gate on signal generated.

The data driver 14 forms a block in which a first DC output 121 of 12 V guided through the low-pass filter 15 and the second DC output 22 of 3.3 V are used as an operating power source. Then, according to a signal indicating luminance of each of the primary colors sent out of the signal processing part 13, a data signal indicating luminance is generated and also a data line (source line) of the liquid crystal panel 12 is driven by the data signal generated.

The back light part 5 includes the cold cathode tubes 41, the reflection plates 42, the optical waveguide plate 43, etc. as described already. Also, the boosting circuit 19 for generating a high voltage for lighting and driving the cold cathode tubes 41 is provided. The boosting circuit 19 forms a block operating by using the first DC output 21 of 12 V as an operating power source, and switching of a current passing through a primary coil is performed by a transistor for performing self-excited oscillation. Then, the cold cathode tubes 41 are lighted and driven by a high voltage generated in a secondary coil.

The control part 7 is mainly constructed of a microcomputer operating from the DC output 22 of 3.3 V, and controls a main operation acting as a television receiver. As a result of this, a channel received by the receiving part 4 is controlled. Also, control of display in the liquid crystal display part 3 is performed. That is, control of luminance, contrast, hue, etc. of video displayed on the liquid crystal panel 12 is performed. Also, luminance of the back light part 5 is controlled through a signal path (not shown).

The regulator circuit 115 forms a filter for preventing a noise component from mixing into the first DC output 121 guided to the data driver 14. That is, the noise component is eliminated so that a noise component which is caused by switching of the boosting circuit 19 and leaks in a path of the first DC output 21 and a noise component which is caused by switching of the second DC power source part 2 and leaks in a path of the first DC output 21 do not mix into the side of a path 121 for guiding the first DC output 21 to the data driver 14.

The regulator circuit 106 forms a circuit for preventing a decrease in receiving sensitivity in the receiving part 4 because a noise component caused at the time when the gate driver 11 drives a gate line diffracts into the side of the receiving part 4.

Figure 6A:
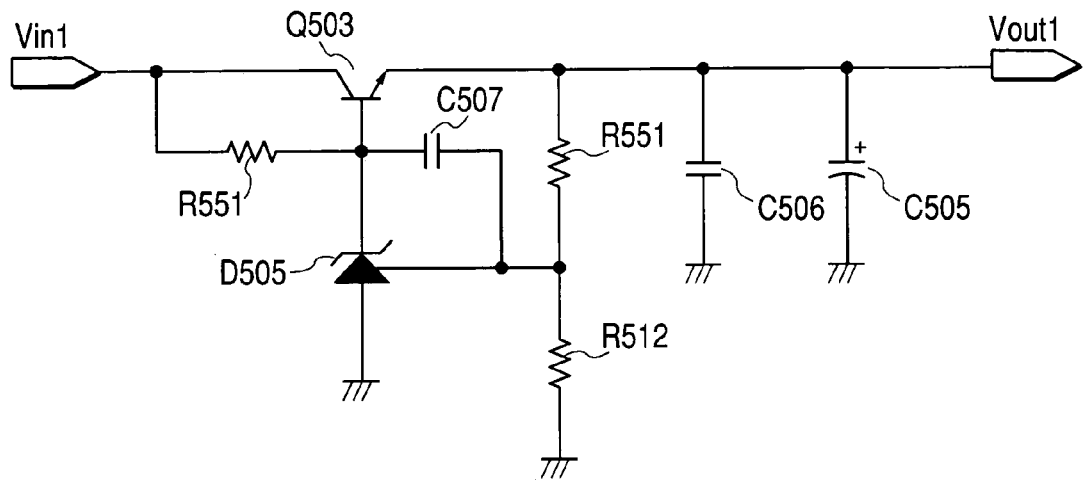
FIG. 6A is an explanatory diagram showing a circuit configuration of the regulator circuit 115.
Figure 6B:
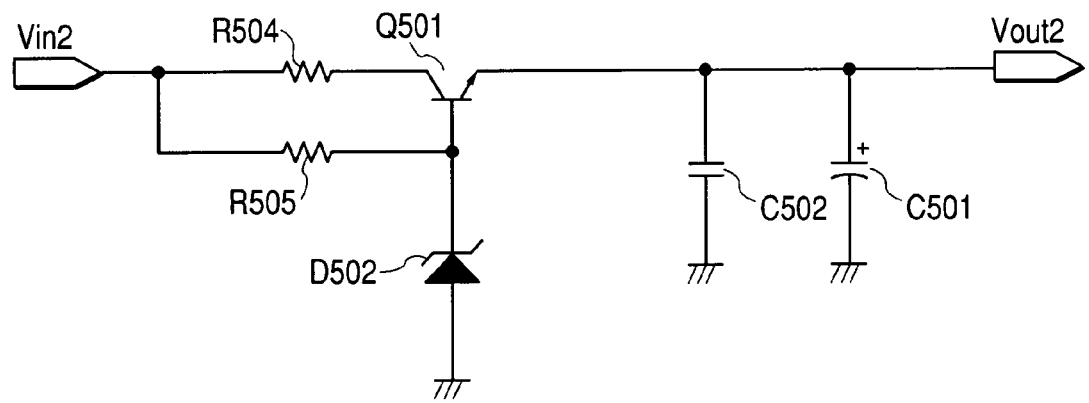
FIG. 6B is an explanatory diagram showing a circuit configuration of the regulator circuit 106 for voltage $V_{on}$ which makes a display device ON condition.
Figure 6C:
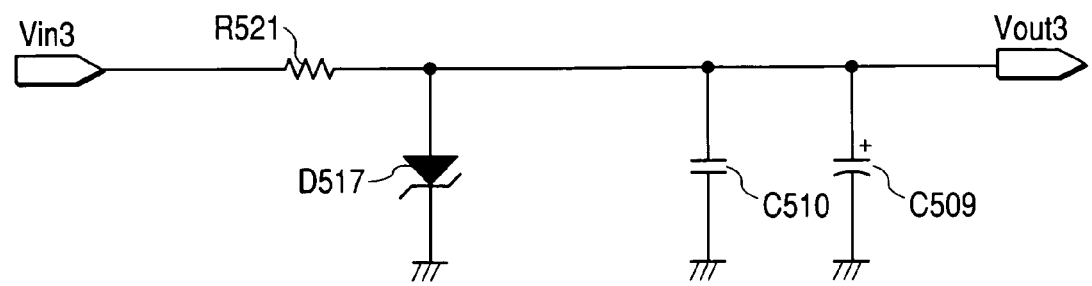
FIG. 6C is an explanatory diagram showing a circuit configuration of the regulator circuit 106 for voltage $V_{off}$ which makes a display device OFF condition.

FIG. 6A is an explanatory diagram showing a circuit configuration of the regulator circuit 115, FIG. 6B is an explanatory diagram showing a circuit configuration of the regulator circuit 106 for voltage $V_{on}$ which makes a display device ON condition, and FIG. 6C is an explanatory diagram showing a circuit configuration of the regulator circuit 106 for voltage $V_{off}$ which makes a display device OFF condition.

Besides, the regulator circuit 115 includes a register R551, a transistor Q503, a diode D505, a condenser C507, a register R551, a register R512, a condenser C506, and a condenser C505.

The regulator circuit 106 for $V_{on}$ includes a register R504, a register R505, a transistor Q501, a diode D502, a condenser C502, and a condenser C501.

The regulator circuit 106 for $V_{off}$ includes a register R521, a diode D517, a condenser C510, and a condenser C509.

An operation of the embodiment made of the configuration will be described.

A first DC power source part 1 which is an AC adapter generates and sends out a first DC output 21 stabilized at 12 V. Also, a boosting circuit 19 of a back light part 5 is constructed so as to drive a cold cathode tube (not shown) using the first DC output 21 as an operating power source. Also, a second DC power source part 2 generates and sends out a second DC output 22 of 3.3 V required by the receiving part 4 etc. using an output 31a as an operating power source.

As a result of that, each block of a back light part 5, a receiving part 4, a control part 7, a gate driver 11, a signal processing part 13 and a data driver 14 is set in an operating state.

That is, a boosting circuit 19 lights and drives cold cathode tubes 41 using the first DC output 21 as an operating power source. As a result of this, a liquid crystal panel 12 is illuminated from the back. Also, a tuner 16 in the receiving part 4 generates a tuning signal from the DC output 24, and applies the tuning signal to a variable capacitance diode 18 which is a component element of a tuning circuit 17. Therefore, a tuning frequency of the tuning circuit 17 is set at a frequency corresponding to a received channel. As a result of that, a video signal of the received channel is sent out to a liquid crystal display part 3.

The gate driver 11 of the liquid crystal display part 3 generates a gate on signal using a DC output 242 and drives a gate line of the liquid crystal panel 12. Also, the data driver 14 generates a signal indicating luminance using a first DC output 21a guided through a regulator circuit 115 and drives a data line of the liquid crystal panel 12 by the signal generated. As a result of that, video of a received channel is displayed on the liquid crystal panel 12.

Second Embodiment

Another embodiment of the invention will be described below with reference to the drawings.

Figure 2:
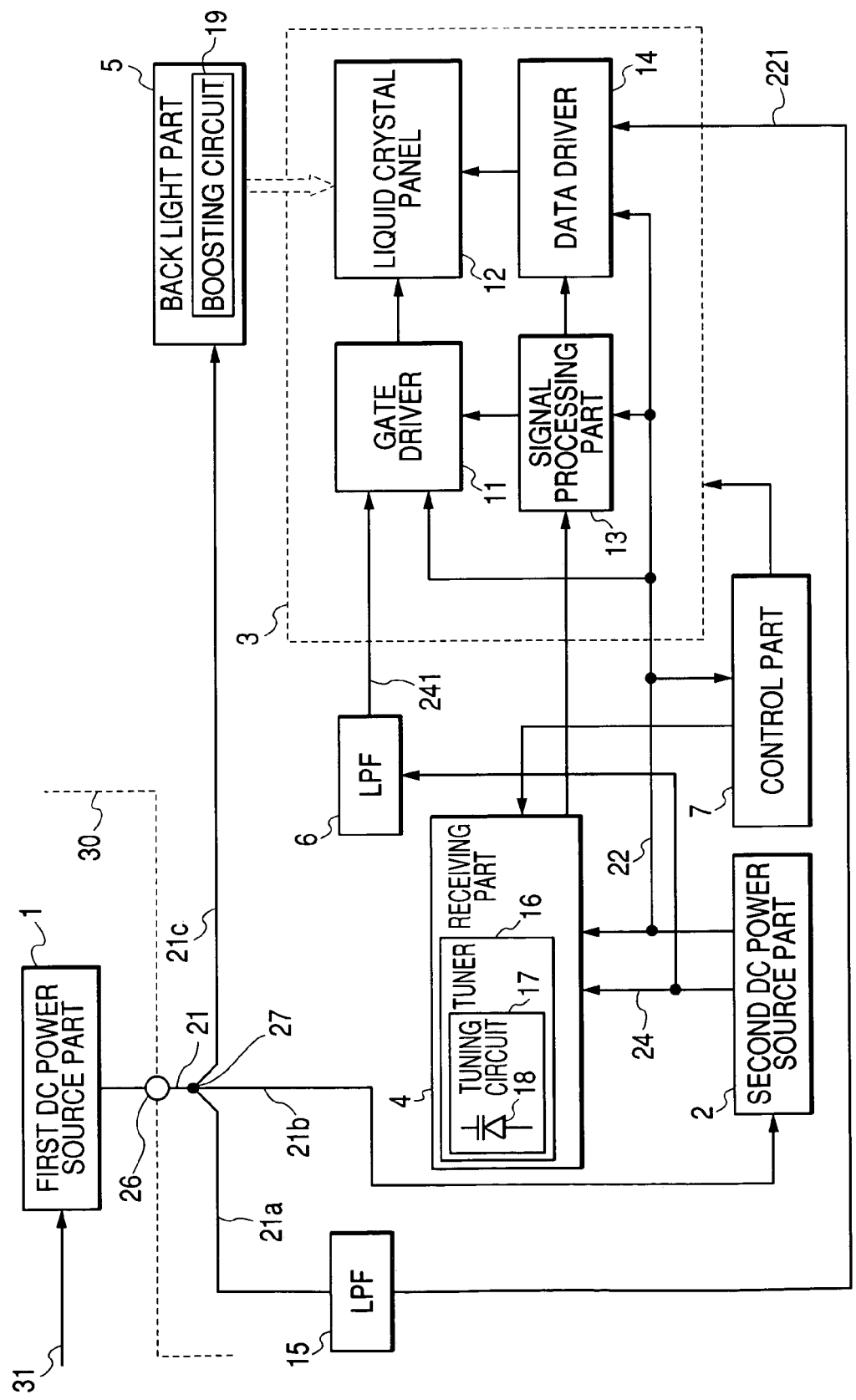
FIG. 2 is a block diagram showing an electrical configuration of a liquid crystal television receiver to which another embodiment of a liquid crystal display apparatus according to the invention is applied.

FIG. 2 is a block diagram showing an electrical configuration of the liquid crystal television receiver, and the same signs as signs in FIG. 5 are attached to blocks with the same configuration as that of the conventional art shown in FIG. 5.

A first DC power source part 1 which is an AC adapter configured by a switching power source generates a first DC output 21 of 12 V from a commercial power source 31. Then, the first DC output 21 generated is sent out to a power source input terminal 26 provided in the back of an apparatus body 30. The first DC output 21 guided to the power source input terminal 26 is guided to a boosting circuit 19 of a back light part 5 and a second DC power source part 2 as an operating power source. Also, the first DC output 21 guided to the power source input terminal 26 is guided to a data driver 14 through a low-pass filter 15.

The second DC power source part 2 generates a second DC output 22 of 3.3 V from the DC output 21 of 12 V. Then, the second DC output 22 generated is sent out to a gate driver 11, a signal processing part 13, the data driver 14, a receiving part 4 and a control part 7. Also, the second DC power source part 2 generates a DC output 24 of 33 V used as a DC power source for tuning used in order that a tuner 16 of the receiving part 4 converts a tuning frequency of a tuning circuit 17 into a target frequency, and sends out the DC output 24 to the receiving part 4. Also, the DC output 24 is sent out to the gate driver 11 through a low-pass filter 6. That is, it is constructed so that the DC output 24 of 33 V is used as a power source for an analog circuit of the receiving part 4 and also is used as a power source of the gate driver 11 which is a circuit block for performing a digital operation.

The receiving part 4 receives commercial broadcast of a channel instructed by the control part 7 and also sends out a video signal obtained by the receiving to the signal processing part 13 of a liquid crystal display part 3. For this purpose, the tuner 16 is provided. Then, the tuner 16 sets a tuning frequency of the tuning circuit 17 at a frequency corresponding to a received channel by applying a tuning signal generated from the DC output 24 to a variable capacitance diode 18 which is an element forming the tuning circuit 17.

The liquid crystal display part 3 displays a video signal sent out of the receiving part 4 on the liquid crystal panel 12. For this purpose, the gate driver 11, the signal processing part 13 and the data driver (source driver) 14 are provided. The signal processing part 13 forms a block in which the DC output 22 of 3.3 V is used as an operating power source. Then, a signal indicating timing of scanning is generated from the video signal sent out of the receiving part 4 and is sent out to the gate driver 11. Also, a signal indicating luminance about each of the primary colors is generated from the video signal and is sent out to the data driver 14.

The gate driver 11 forms a block in which a DC output 241 of 33 V sent out of the low-pass filter 6 and the second DC output 22 of 3.3 V are used as an operating power source (a current value of the DC output 241 is 10 mA at the maximum and a normal current value is several mA). Then, a gate on signal is generated from the DC output 241 according to a signal indicating timing of scanning sent out of the signal processing part 13. And, a gate line of the liquid crystal panel 12 is driven by the gate on signal generated.

The data driver 14 forms a block in which a first DC output 221 of 12 V guided through the low-pass filter 15 and the second DC output 22 of 3.3 V are used as an operating power source. Then, according to a signal indicating luminance of each of the primary colors sent out of the signal processing part 13, a data signal indicating luminance is generated and also a data line (source line) of the liquid crystal panel 12 is driven by the data signal generated.

The back light part 5 includes the cold cathode tubes 41, the reflection plates 42, the optical waveguide plate 43, etc. as described already. Also, the boosting circuit 19 for generating a high voltage for lighting and driving the cold cathode tubes 41 is provided. The boosting circuit 19 forms a block operating by using the first DC output 21 of 12 V as an operating power source, and switching of a current passing through a primary coil is performed by a transistor for performing self-excited oscillation. Then, the cold cathode tubes 41 are lighted and driven by a high voltage generated in a secondary coil.

The control part 7 is mainly constructed of a microcomputer operating from the DC output 22 of 3.3 V, and controls a main operation acting as a television receiver. As a result of this, a channel received by the receiving part 4 is controlled. Also, control of display in the liquid crystal display part 3 is performed. That is, control of luminance, contrast, hue, etc. of video displayed on the liquid crystal panel 12 is performed. Also, luminance of the back light part 5 is controlled through a signal path (not shown).

The low-pass filter 15 forms a filter for preventing a noise component from mixing into the first DC output 221 guided to the data driver 14. That is, the noise component is eliminated so that a noise component which is caused by switching of the boosting circuit 19 and leaks in a path of the first DC output 21 and a noise component which is caused by switching of the second DC power source part 2 and leaks in a path of the first DC output 21 do not mix into the side of a path 21a for guiding the first DC output 21 to the data driver 14.

The low-pass filter 6 forms a filter for preventing a decrease in receiving sensitivity in the receiving part 4 because a noise component caused at the time when the gate driver 11 drives a gate line diffracts into the side of the receiving part 4.

Figure 4:
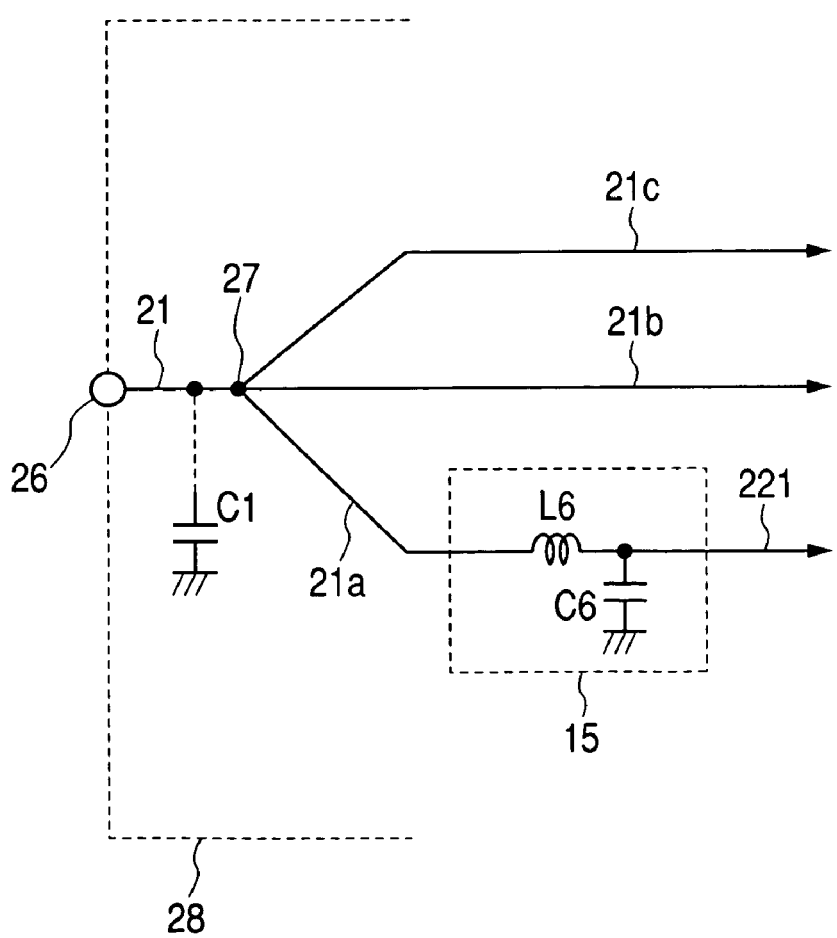
FIG. 4 is an explanatory diagram showing a circuit of a low-pass filter and a shape of branching of a path of a first DC output.

FIG. 4 is an explanatory diagram showing a circuit configuration of the low-pass filter 15 and a shape of branching of a path of the first DC output 21.

The low-pass filter 15 includes an inductor L6. Also, it includes a capacitor C6 connected between an earth level and a terminal of the side connected to the data driver 14 out of a pair of terminals of the inductor L6. Also, numeral 28 shows a printed wiring board including the second DC power source part 2, the low-pass filter 15, the boosting circuit 19, etc. Then, the first DC output 21 guided to the printed wiring board 28 through the power source input terminal 26 branches to three patterns 21a to 21c in a position 27 near to the power source input terminal 26. Then, it is configured so that the pattern 21a guides the first DC output 21 to the low-pass filter 15 and the pattern 21b guides the first DC output 21 to the second DC power source part 2 and the pattern 21c guides the first DC output 21 to the boosting circuit 19.

That is, it is configured so that a path 21a of the first DC output 21 ranging from the first DC power source part 1 to the data driver 14 is branched from a path 21c of the first DC output 21 ranging from the first DC power source part 1 to the boosting circuit 19 and a path 21b of the first DC output 21 ranging from the first DC power source part 1 to the second DC power source part 2 in the vicinity of a position (position shown by numeral 27) in which a path length ranging to an output point (power source input terminal 26) of the first DC output 21 sent out by the first DC power source part 1 is minimized within a range capable of branching the path 21a of the first DC output 21 ranging from the first DC power source part 1 to the data driver 14 from the path 21c of the first DC output 21 ranging from the first DC power source part 1 to the boosting circuit 19 and the path 21b of the first DC output 21 ranging from the first DC power source part 1 to the second DC power source part 2.

As a result of this, a path length in which the path 21a for guiding the first DC output 21 to the data driver 14, the path 21b for guiding the first DC output 21 to the second DC power source part 2 and the path 21c for guiding the first DC output 21 to the boosting circuit 19 are shared inside the printed wiring board 28 is short. Therefore, a noise component caused by sharing the paths of the first DC output 21 among noise components intruding into the data driver 14 is reduced.

An operation of the embodiment made of the configuration will be described.

A first DC power source part 1 generates and outputs a first DC output 21. As a result of this, a second DC power source part 2 generates and outputs a second DC output 22 and a DC output 24 of 33 V using the first DC output 21 as an operating power source. As a result of that, each block of a back light part 5, a receiving part 4, a control part 7, a gate driver 11, a signal processing part 13 and a data driver 14 is set in an operating state.

That is, a boosting circuit 19 lights and drives cold cathode tubes 41 using the first DC output 21 as an operating power source. As a result of this, a liquid crystal panel 12 is illuminated from the back. Also, a tuner 16 in the receiving part 4 generates a tuning signal from the DC output 24, and applies the tuning signal to a variable capacitance diode 18 which is a component element of a tuning circuit 17. Therefore, a tuning frequency of the tuning circuit 17 is set at a frequency corresponding to a received channel. As a result of that, a video signal of the received channel is sent out to a liquid crystal display part 3.

The gate driver 11 of the liquid crystal display part 3 generates a gate on signal using a DC output 241 of 33 V and drives a gate line of the liquid crystal panel 12. Also, the data driver 14 generates a signal indicating luminance using a first DC output 21a guided through a low-pass filter 15 and drives a data line of the liquid crystal panel 12 by the signal generated. As a result of that, video of a received channel is displayed on the liquid crystal panel 12.

When the operation described above is performed, a noise component caused by a switching operation for lighting and driving the cold cathode tubes 41 leaks in a path 21c of the first DC output 21 from the boosting circuit 19. Also, a noise component caused by a switching operation for generating the second DC output 22 or the DC output 24 leaks in a path 21b of the first DC output 21 from the second DC power source part 2. However, a path in which the paths 21a to 21c for guiding the first DC output 21 are shared inside a printed wiring board 28 is short. Therefore, a level of a noise component which is caused by sharing the paths of the first DC output 21 and intrudes into the data driver 14 is low. And, the noise component attempting to intrude into the data driver 14 is eliminated in the low-pass filter 15. As a result of that, also when noise components caused by the boosting circuit 19 or the second DC power source part 2 leak in the path of the first DC output 21, a ratio at which these noise components intrude into the data driver 14 is suppressed to a very small value. As a result of this, a decrease in image quality in the liquid crystal panel 12 is prevented.

Incidentally, the invention is not limited to the embodiment described above, and the case of having a shape of being branched into three paths 21a to 21c in one position 27 with respect to the paths 21a to 21c of the first DC output 21 has been described, but it can also have a shape in which paths branch one by one.

Also, it can be configured so that a capacitor (for example, C1 in FIG. 4) is connected between an earth level and a path of the first DC output 21 in a position of the vicinity of the branch position 27. Then, in the case of this configuration, a noise component intruding into the data driver 14 can be reduced more.

As described above, in the first embodiment of the invention, a regulator circuit for eliminating a noise component caused by a boosting circuit is inserted into a path of a first DC output ranging from a first DC power source part to a data driver. Therefore, the noise components leaking in the path of the first DC output are eliminated by the regulator circuit, so that a noise level intruding into the data driver is reduced.

Further, in the second embodiment of the invention, a low-pass filter for eliminating a noise component caused by a boosting circuit and a noise component caused by a second DC power source part is inserted into a path of a first DC output ranging from a first DC power source part to a data driver. Also, the path of the first DC output ranging from the first DC power source part to the data driver is branched from a path of the first DC output ranging from the first DC power source part to the boosting circuit and a path of the first DC output ranging from the first DC power source part to a second DC power source part in the vicinity of a position in which a path length ranging to an output point of the first DC output sent out by the first DC power source part is minimized within a range capable of branching the path of the first DC output ranging from the first DC power source part to the data driver from the path of the first DC output ranging from the first DC power source part to the boosting circuit and the path of the first DC output ranging from the first DC power source part to the second DC power source part. Therefore, a noise component leaking in the path of the first DC output from the boosting circuit or the second DC power source part is eliminated by the low-pass filter, and a noise level intruding into the data driver is reduced. Also, with respect to a noise level caused by sharing the path of the first DC output used as an operating power source, the level is suppressed to a very small value. As a result of this, when an operating power source of the boosting circuit or the DC power source part and an operating power source of the data driver are shared, a decrease in image quality resulting from noise caused by the boosting circuit or the DC power source part can be suppressed efficiently.

Also, in the second embodiment of the invention, a low-pass filter for eliminating a noise component caused by a boosting circuit is inserted into a path of a first DC output ranging from a first DC power source part to a data driver. Therefore, a noise component leaking in the path of the first DC output from the boosting circuit is eliminated by the low-pass filter, so that a noise level intruding into the data driver is reduced. As a result of this, when an operating power source of the boosting circuit and an operating power source of the data driver are shared, a decrease in image quality resulting from noise caused by the boosting circuit can be prevented.

Further, a path of the first DC output ranging from the first DC power source part to the data driver and a path of the first DC output ranging from the first DC power source part to the boosting circuit are branched in the vicinity of a position in which a path length ranging to an output point of the first DC output sent out by the first DC power source part is minimized within a range capable of branching the path of the first DC output ranging from the first DC power source part to the data driver and the path of the first DC output ranging from the first DC power source part to the boosting circuit. Therefore, with respect to a noise level caused by sharing the path of the first DC output used as an operating power source, the level is suppressed to a very small value, so that a decrease in image quality resulting from noise caused by the boosting circuit can be reduced more.

What is claimed is:

1. A liquid crystal television receiver in which video by a video signal outputted by a receiving part is displayed on a liquid crystal panel, comprising:

a liquid crystal panel for performing active matrix driving;

a gate driver for driving a gate line of the liquid crystal panel;

a data driver for driving a data line of the liquid crystal panel by a signal corresponding to luminance of a pixel;

a cold cathode tube used as a light source of a back light part for illuminating the liquid crystal panel from the back;

a boosting circuit for driving and lighting the cold cathode tube;

a first DC power source part for generating a first DC output used as an operating power source of the data driver and also used as an operating power source of the boosting circuit;

a second DC power source part which is a switching power source for generating a second DC output using the first DC output as an operating power source;

a receiving part for using the second DC output as an operating power source and receiving commercial broadcast and also outputting a video signal obtained by the receiving; and a regulator circuit for eliminating a noise component caused by the boosting circuit and a noise component caused by the second DC power source part, wherein:

the regulator circuit is inserted into a path of the first DC output ranging from the first DC power source part to the data driver; and the path of the first DC output ranging from the first DC power source part to the data driver is branched from a path of the first DC output ranging from the first DC power source part to the boosting circuit.

2. A liquid crystal display apparatus comprising:

a liquid crystal panel for performing active matrix driving and displaying video by a video signal;

a gate driver for driving a gate line of the liquid crystal panel;

a data driver for driving a data line of the liquid crystal panel by a signal corresponding to luminance of a pixel;

a cold cathode tube used as a light source of a back light part for illuminating the liquid crystal panel from the back;

a boosting circuit for driving and lighting the cold cathode tube;

a first DC power source part for generating a first DC output used as an operating power source of the data driver and also used as an operating power source of the boosting circuit; and a regulator circuit for eliminating a noise component caused by the boosting circuit, wherein:

the regulator circuit is inserted into a path of the first DC output ranging from the first DC power source part to the data driver.

3. A liquid crystal display apparatus according to claim 2, wherein
the path of the first DC output ranging from the first DC power source part to the data driver is branched from a path of the first DC output ranging from the first DC power source part to the boosting circuit.

4. A liquid crystal television receiver in which video by a video signal outputted by a receiving part is displayed on a liquid crystal panel, comprising:
a liquid crystal panel for performing active matrix driving;
a gate driver for driving a gate line of the liquid crystal panel;
a data driver for driving a data line of the liquid crystal panel by a signal corresponding to luminance of a pixel;
a cold cathode tube used as a light source of a back light part for illuminating the liquid crystal panel from the back;
a boosting circuit for driving and lighting the cold cathode tube;
a first DC power source part for generating a first DC output used as an operating power source of the data driver and also used as an operating power source of the boosting circuit;
a second DC power source part which is a switching power source for generating a second DC output using the first DC output as an operating power source;
a receiving part for using the second DC output as an operating power source and receiving commercial broadcast and also outputting a video signal obtained by the receiving; and
a low-pass filter for eliminating a noise component caused by the boosting circuit and a noise component caused by the second DC power source part, wherein:
the low-pass filter is inserted into a path of the first DC output ranging from the first DC power source part to the data driver; and
the path of the first DC output ranging from the first DC power source part to the data driver is branched from a path of the first DC output ranging from the first DC power source part to the boosting circuit and a path of the first DC output ranging from the first DC power source part to the second DC power source part in the vicinity of a position in which a path length ranging to an output point of the first DC output sent out by the first DC power source part is minimized within a range capable of branching the path of the first DC output ranging from the first DC power source part to the data driver from the path of the first DC output ranging from the first DC power source part to the boosting circuit and the path of the first DC output ranging from the first DC power source part to the second DC power source part.

5. A liquid crystal display apparatus comprising:
a liquid crystal panel for performing active matrix driving and displaying video by a video signal,
a gate driver for driving a gate line of the liquid crystal panel,
a data driver for driving a data line of the liquid crystal panel by a signal corresponding to luminance of a pixel,
a cold cathode tube used as a light source of a back light part for illuminating the liquid crystal panel from the back,
a boosting circuit for driving and lighting the cold cathode tube, and
a first DC power source part for generating a first DC output used as an operating power source of the data driver and also used as an operating power source of the boosting circuit,
a low-pass filter for eliminating a noise component caused by the boosting circuit, wherein
the low-pass filter is inserted into a path of the first DC output ranging from the first DC power source part to the data driver.

6. A liquid crystal display apparatus according to claim 5, wherein
a path of the first DC output ranging from the first DC power source part to the data driver and a path of the first DC output ranging from the first DC power source part to the boosting circuit are branched in the vicinity of a position in which a path length ranging to an output point of the first DC output sent out by the first DC power source part is minimized within a range capable of branching the path of the first DC output ranging from the first DC power source part to the data driver and the path of the first DC output ranging from the first DC power source part to the boosting circuit.

* * * * *